US008560202B2

(12) United States Patent
Pebley et al.

(10) Patent No.: US 8,560,202 B2
(45) Date of Patent: Oct. 15, 2013

(54) METHOD AND APPARATUS FOR IMPROVED CLIMATE CONTROL FUNCTION IN A VEHICLE EMPLOYING ENGINE STOP/START TECHNOLOGY

(75) Inventors: Kirk Pebley, Novi, MI (US); Kenneth J. Jackson, Dearborn, MI (US); Thomas Scott Gee, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 537 days.

(21) Appl. No.: 12/916,702

(22) Filed: Nov. 1, 2010

(65) Prior Publication Data

US 2012/0109469 A1 May 3, 2012

(51) Int. Cl.
*G06F 19/00* (2011.01)

(52) U.S. Cl.
USPC ............... 701/99; 701/22; 701/36; 180/53.8; 180/65.21; 180/65.265; 62/323.4

(58) Field of Classification Search
None
See application file for complete search history.

(56) References Cited

U.S. PATENT DOCUMENTS

| | | | | |
|---|---|---|---|---|
| 4,021,677 A * | 5/1977 | Rosen et al. ................ 290/40 R |
| 4,284,053 A * | 8/1981 | Merrick ......................... 123/497 |
| 4,408,582 A * | 10/1983 | Merrick .................... 123/406.46 |
| 4,467,761 A * | 8/1984 | Hasegawa ..................... 123/327 |
| 4,479,472 A * | 10/1984 | Shimamura .............. 123/339.18 |
| 4,625,281 A * | 11/1986 | Deutsch ......................... 701/101 |
| 4,788,487 A * | 11/1988 | Picklesimer ...................... 322/1 |
| 4,836,164 A * | 6/1989 | Morozumi et al. ....... 123/339.17 |
| 4,898,005 A * | 2/1990 | Sakurai ............................ 62/115 |
| 5,072,597 A * | 12/1991 | Bromley et al. ................. 62/209 |
| 5,163,399 A * | 11/1992 | Bolander et al. ......... 123/339.17 |
| 5,216,895 A * | 6/1993 | Kawai et al. ..................... 62/133 |
| 5,365,445 A * | 11/1994 | Takizawa ......................... 701/99 |
| 5,463,993 A * | 11/1995 | Livshits et al. ............ 123/339.2 |
| 5,559,704 A * | 9/1996 | Vanek et al. ..................... 701/99 |
| 5,806,485 A * | 9/1998 | DeGeorge ................ 123/339.17 |
| 6,226,585 B1 * | 5/2001 | Cullen ............................ 701/54 |
| 6,379,283 B1 * | 4/2002 | Cullen .......................... 477/110 |
| 6,553,958 B1 * | 4/2003 | Kolmanovsky et al. ...... 123/295 |
| 6,564,774 B2 * | 5/2003 | Ellims et al. .................. 123/352 |
| 6,668,224 B2 * | 12/2003 | Kawai et al. ..................... 701/54 |
| 6,755,032 B1 * | 6/2004 | Kotwicki et al. ............... 62/133 |
| 6,763,296 B2 * | 7/2004 | Aldrich et al. ................ 701/110 |

(Continued)

FOREIGN PATENT DOCUMENTS

DE  3307220  9/1984
JP  58209613  12/1983

*Primary Examiner* — Thomas Tarcza
*Assistant Examiner* — Richard Goldman
(74) *Attorney, Agent, or Firm* — Vichit Chea; Brooks Kushman P.C.

(57) ABSTRACT

An internal combustion engine has an engine shut-down system that automatically interrupts engine operation when vehicle operation indicates that no torque is required from the engine. An air conditioner compressor operates to cool a passenger compartment of the vehicle and is actuated in a first phase time, and is not actuated in a second phase time. An override system compares the time the compressor is in the enabled first phase time to the time the compressor is in the disabled second phase time. The override system disables the engine shut-down system unless it is determined that a ratio of the disabled second phase time to the enabled first phase time has a low rate of change, that the ratio is greater than a predetermined value, and that the time the compressor is in the disabled second phase is greater than a predetermined value.

16 Claims, 3 Drawing Sheets

(56) References Cited

U.S. PATENT DOCUMENTS

| | | | |
|---|---|---|---|
| 6,845,305 B1* | 1/2005 | Raftari et al. | 701/22 |
| 7,017,360 B2* | 3/2006 | Kotwicki et al. | 62/133 |
| 7,032,393 B2* | 4/2006 | Tamai et al. | 62/115 |
| 7,552,705 B2* | 6/2009 | Serkh et al. | 123/179.4 |
| 7,635,922 B2* | 12/2009 | Becker | 290/40 C |
| 8,205,594 B2* | 6/2012 | Fore et al. | 123/339.18 |
| 8,406,954 B2* | 3/2013 | Whitney et al. | 701/36 |
| 2003/0018415 A1* | 1/2003 | Sonobe et al. | 700/275 |
| 2003/0233835 A1* | 12/2003 | Tomita et al. | 62/133 |
| 2004/0112074 A1* | 6/2004 | Komura et al. | 62/228.5 |
| 2005/0044873 A1* | 3/2005 | Tamai et al. | 62/323.1 |
| 2005/0193747 A1* | 9/2005 | Kajimoto et al. | 62/133 |
| 2007/0255488 A1* | 11/2007 | Okubo et al. | 701/110 |
| 2008/0306670 A1* | 12/2008 | Masterson et al. | 701/99 |
| 2009/0015203 A1* | 1/2009 | Oakes | 320/132 |
| 2009/0024264 A1* | 1/2009 | Aldrich et al. | 701/22 |
| 2010/0042277 A1* | 2/2010 | Naik et al. | 701/22 |
| 2010/0050671 A1* | 3/2010 | Kahn et al. | 62/190 |
| 2010/0125383 A1* | 5/2010 | Caouette | 701/21 |
| 2010/0145562 A1* | 6/2010 | Moran | 701/22 |
| 2010/0163220 A1* | 7/2010 | Nakajima | 165/202 |
| 2012/0083988 A1* | 4/2012 | Miyata et al. | 701/99 |
| 2012/0109469 A1* | 5/2012 | Pebley et al. | 701/48 |
| 2012/0253595 A1* | 10/2012 | Oakes | 701/36 |
| 2012/0271525 A1* | 10/2012 | Bucci et al. | 701/99 |
| 2013/0060444 A1* | 3/2013 | Matsunaga et al. | 701/99 |

* cited by examiner

METHOD AND APPARATUS FOR IMPROVED CLIMATE CONTROL FUNCTION IN A VEHICLE EMPLOYING ENGINE STOP/START TECHNOLOGY

BACKGROUND

1. Technical Field

The present disclosure relates to an engine system in a vehicle that overrides an engine shut-down system based upon the operation of the air conditioner compressor of the vehicle.

2. Background

Full hybrid vehicles are vehicles that are equipped with a battery-powered motor that is capable of propelling the vehicle without assistance from an internal combustion engine. Mild hybrid and other "Stop/Start" vehicle system configurations are vehicles that enable engine to be turned off whenever the vehicle is coasting, braking, and/or stopped, yet restarted quickly when required. When the driver presses the gas pedal to accelerate the vehicle, the engine is required to restart quickly to accelerate the vehicle. As opposed to a full hybrid, mild hybrids do not have an exclusive electric-only mode of propulsion and therefore rely on the quick restart of the combustion engine to accelerate the vehicle on demand.

Conventional air conditioners are driven by the engine in a mild hybrid vehicle. During the time that the engine is in a shut-down mode, the compressor of the air conditioner is no longer powered by the engine, and therefore does not work to compress fluid in the air conditioning system. Therefore, air conditioning systems in mild hybrid vehicles lose effectiveness while the engine is temporarily shut down.

It is necessary to maintain passenger comfort while the engine of a mild hybrid is in shut-down mode. One way to maintain passenger comfort includes the use of a system that restarts the engine whenever the air in the vehicle cabin becomes too warm. One problem with this approach is that the engine may frequently stop and restart to reach and maintain an optimal cabin temperature. Frequent engine stopping and restarting may be referred to as "on/off busyness" that is objectionable to vehicle occupants. Another way to maintain passenger comfort includes the use of temperature sensors, humidity sensors, and sun load sensors to predict when the shut-down mode would be undesirable. These sensors are typically expensive and therefore undesirable in some vehicles. Algorithms are typically used in combination with these sensors to maintain passenger comfort.

There is currently a need for a cost effective system by eliminating or minimizing the use of sensors while assuring the comfort of vehicle occupants without unwanted turning off and restarting of the engine.

SUMMARY

According to one aspect of the present disclosure, an engine system for a vehicle is provided. The engine system includes an internal combustion engine that has an engine automatic shut-down system. The engine shut-down system automatically interrupts engine operation when vehicle operation indicates that no torque is required from the engine. For example, the engine shut-down system may conserve energy and shut the engine down if the vehicle is coasting, braking, or stopped. An air conditioner compressor operates to cool a passenger compartment of the vehicle. The compressor is actuated in a first phase time, and is not actuated in a second phase time. An override system compares the time the compressor is in the enabled first phase time to the time the compressor is in the disabled second phase time. The override system disables the engine shut-down system unless it is determined that a ratio of the disabled second phase time to the enabled first phase time has a low rate of change, that the ratio is greater than a predetermined value, and that the time the compressor is in the disabled second phase is greater than a predetermined value.

In another aspect of the present disclosure, an engine system includes an engine and an air conditioner that cools a passenger compartment of the vehicle. The air conditioner includes a clutch that engages and disengages a compressor in a duty cycle. The engine shut-down system automatically interrupts engine operation when vehicle operation indicates that no torque is required from the engine. An override system monitors the duty cycle of the clutch and decides whether or not to disable the engine shut-down system. The override system disables the engine shut-down system unless the duty cycle has a rate of change of approximately zero, is greater than a predetermined ratio, and the compressor is disengaged for at least a predetermined time.

According to another aspect of the present disclosure, an air conditioning system is provided for a vehicle that has an engine and an engine shut-down system that automatically stops the engine. The air conditioning system includes a compressor and a clutch that engages and disengages the compressor in an activated phase and a deactivated phase, respectively. A clutch status signal generator generates a clutch status signal, indicating that the clutch is either in the activated phase or in the deactivated phase. A control module monitors the clutch status signal, and according to the signal either enables or disables the engine stop system. The control module may determine the ratio of the time the clutch is in the deactivated time to the time the clutch is in the activated time. The control module enables the engine stop system if this ratio has a rate of change that is approximately zero, if the ratio is greater than a predetermined ratio, and if the deactivated phase time is greater than a predetermined time.

DETAILED DESCRIPTION

Detailed embodiments of the present disclosure are disclosed, but it should be understood that the disclosed embodiments may be embodied in various and alternative forms. The figures are not necessarily to scale and some features may be exaggerated or minimized to show details of particular components. Specific structural and functional details disclosed by Applicant are not to be interpreted as limiting, but merely as a representative basis for teaching one skilled in the art how to practice the present disclosure.

Figure 1:
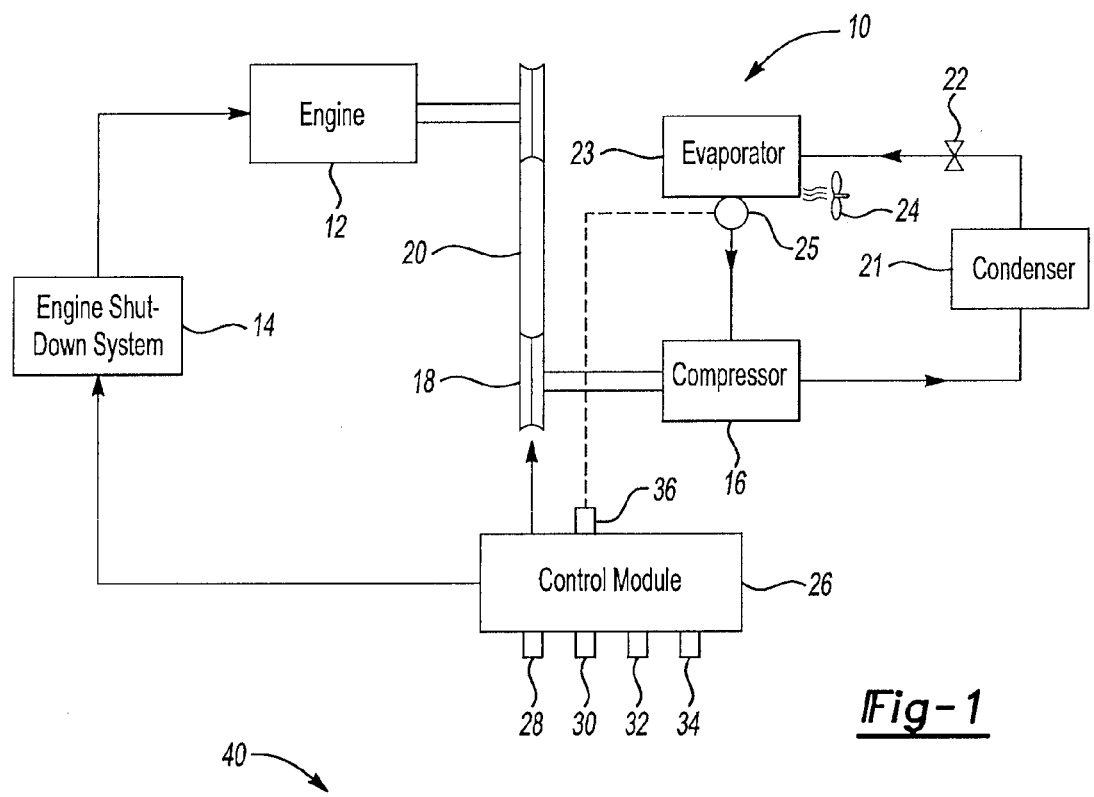
FIG. 1 is a block diagram showing the structure of an engine system for a vehicle according to at least one embodiment of the present disclosure.

Referring to FIG. 1, a vehicle system 10 is shown that has an engine 12 and an engine shut-down system 14. The engine shut-down system shuts down the engine 12 to conserve fuel when vehicle operation indicates that no torque is required from the engine (e.g. when the vehicle is coasting, braking, and/or stopped). The engine load must be below a predetermined value in order to trigger the engine shut-down system 14 to shut down the engine 12. An air conditioner compressor 16 is actuated by a clutch 18 and power is transmitted from the engine 12, through a belt 20 and to the clutch 18 that actuates the compressor 16. When the compressor 16 is actuated by the clutch 18, cool air may be provided to vehicle occupants from an air conditioning system. Air conditioning systems art known in the art and may include a condenser 21 to condense refrigerant fluid, an expansion valve 22, or expansion device, to expand the refrigerant fluid, an evaporator 23 that cools air by absorbing heat from ambient air. The system may also include a fan 24 that blows the cooler air into the cabin of the vehicle. A pressure switch 25, or thermister, may indicate when the refrigerant pressure provided to the compressor 16 is too low for compressor operation. The clutch 18 can also be in a deactivated phase in which the clutch 18 does not actuate the compressor 16. In the deactivated phase the compressor 16 does not compress fluid in the air conditioning system.

A control module 26 includes a clutch status sensor 28 that senses when the clutch 18 engages the compressor 16 in an activated phase, and senses when the clutch 18 disengages the compressor 16 in a deactivated phase. It should be understood that the status of the clutch may be determined by a clutch status signal generator, and the sensor or signal generator may be located in any location such that the engagement or disengagement of the clutch can be determined. The control module 26 compares the time that the compressor is in an activated phase with the time the compressor is in a deactivated phase to override and disable the engine shut-down system 14, preventing the engine 12 from shutting down.

In an automatic climate control system, the control module 26 may also include a sun load sensor 30 that senses the amount of sun load entering the vehicle, a humidity sensor 32 that senses the humidity in the vehicle, and a cabin temperature sensor 34 that senses the temperature of the air in the cabin of the vehicle. The evaporator low temperature sensor or low pressure cycling switch 25 indicates when refrigerant pressure entering the compressor 16 is too low for compressor operation. The control module 26 decides whether or not the compressor 16 should work the air conditioning system to provide cooler air to the cabin of the vehicle based upon the data provided by the sensors 30, 32, 34 and the switch 25 that is provided to the input 36 for the control module 26.

In a manual climate control system, a vehicle occupant can increase amount of time that the compressor 16 is actuated by decreasing the desired temperature on a vehicle user interface or by increasing the quantity of air passing over the evaporator by increasing the fan 24 speed. In the manual climate control system sensors 30, 32, 34 may not be present, in which case compressor control could be strictly determined by the state of the low pressure cycling switch input. It should be understood that control module 26 may also be part of the powertrain control module of a vehicle. It should further be understood that sensors 30, 32, 34 may communicate with the same control module 26 that the clutch status sensor 28 communicates with, or the sensors 30, 32, 34 may communicate with a separate air conditioning control module. It should also be understood that the clutch status sensor may, or may not be a physical device. It may be just the result of calculations made within the control module used to determine clutch actuation.

Figure 2:
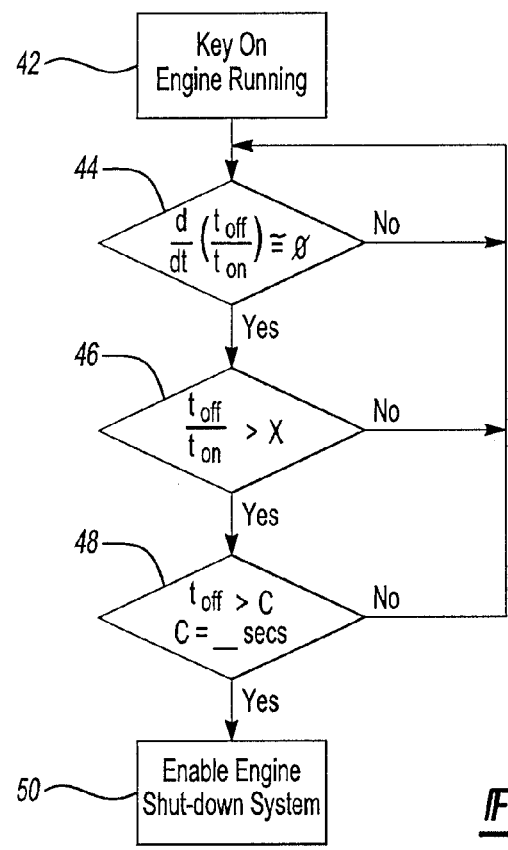
FIG. 2 is a flow chart showing an override system that overrides an engine shut-down system according to one embodiment of the present disclosure.

Referring to FIGS. 1 and 2, one embodiment of an override system 40 is disclosed. The override system 40 includes input from the clutch status sensor 28 in which the time the clutch activates the compressor ($t_{on}$) is measured, and the time the clutch does not activate the compressor ($t_{off}$) is measured. The air conditioning system may use refrigerant pressure, evaporator temperature, or air temperature to modulate the air conditioner clutch 18 on and off to prevent freezing of the evaporator. The clutch status sensor 28 senses the time the clutch 18 is on and off, and uses this as feedback to the control module 26 and to the override system 40.

The override system 40 begins at Key On Engine Running (KOER) 42, in which a vehicle occupant has turned a key or otherwise started the engine. A ratio determination is made at 44 as to the ratio of $t_{off}$ to $t_{on}$, and whether or not the rate of change of this ratio is approximately zero. The rate of change 44 may be calculated over any predetermined range or may be calculated as an instantaneous rate of change, but preferably the rate of change is calculated over the previous 5 to 10 clutch cycles. The rate of change determination 44 may infer whether or not the temperature of the air in the cabin is stable. It should be noted that the rate of change being "approximately zero" means that the rate of change of the ratio of $t_{off}$ to $t_{on}$ is within a predetermined de minimis range or threshold that is sufficient to assure passenger comfort.

If the rate of change determination at 44 is not approximately zero ("No"), the engine shut-down system 14 is disabled. However, if the rate of change determination at 44 is approximately zero ("Yes"), then a ratio determination is calculated at 46. A determination is made as to whether the ratio of $t_{off}$ to $t_{on}$ of the clutch 18 is greater than a predetermined ratio. Again, this determination may be calculated over any predetermined range, but preferably the ratio is calculated over the previous 5 to 10 clutch cycles. The predetermined ratio "X" may be set as any value, but preferably the predetermined ratio "X" is between 0.2 and 2.0, and more preferably the predetermined ratio "X" is 0.9. The ratio determination 46 may infer whether or not the temperature of the air in the cabin is at a comfortable level as set by the vehicle occupants.

If the ratio determination at 46 is not greater than the predetermined value ("No"), the engine shut-down system 14 is disabled. However, if the ratio determination at 46 is greater than the predetermined ratio ("Yes"), then a compressor off time is evaluated at 48. The clutch status sensor senses the time that the compressor is off ($t_{off}$), and the control module compares $t_{off}$ with a predetermined time "C". The predetermined time "C" may be any predetermined time, but preferably more than 10 seconds. If the compressor off time is not above a threshold time ("No"), the engine shut-down system is disabled. However, if the compressor off time is above a threshold time ("Yes"), the engine shut-down system 14 is enabled at 50.

If any one of the rate of change determination 44, ratio determination 46, or $t_{off}$ comparison 48 yield an output of "No", this means that either the cabin temperature is not stable, is not comfortable, or a threshold $t_{off}$ is not reached, respectively. In any "No" result, the control module 26 disables the engine shut-down system 14. This prevents the engine 12 from shutting down in a situation where a restart of the engine 12 would quickly be necessary to keep the air conditioning system effective in cooling the air in the vehicle cabin. This provides a vehicle system 10 that assures a comfort level to vehicle occupants without unwanted turning off and restarting of the engine.

Figure 3:
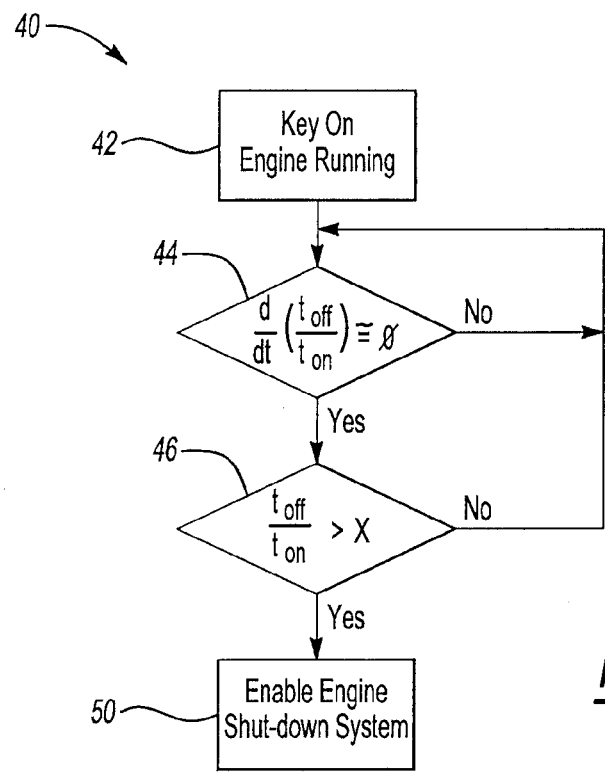
FIG. 3 is a flow chart showing an override system that overrides an engine shut-down system according to an alternative embodiment of the present disclosure.

Referring to FIG. 3, another embodiment of an override system 40 is disclosed. Once KOER 42 is determined, the rate of change determination 44 and the ratio determination 46 are made similar to the embodiment in FIG. 2. If the calculations yield "Yes" for both, the engine shut-down system 14 is enabled, but if either determination 46, 48 yields "No," the engine shut-down system 14 is disabled.

Figure 4:
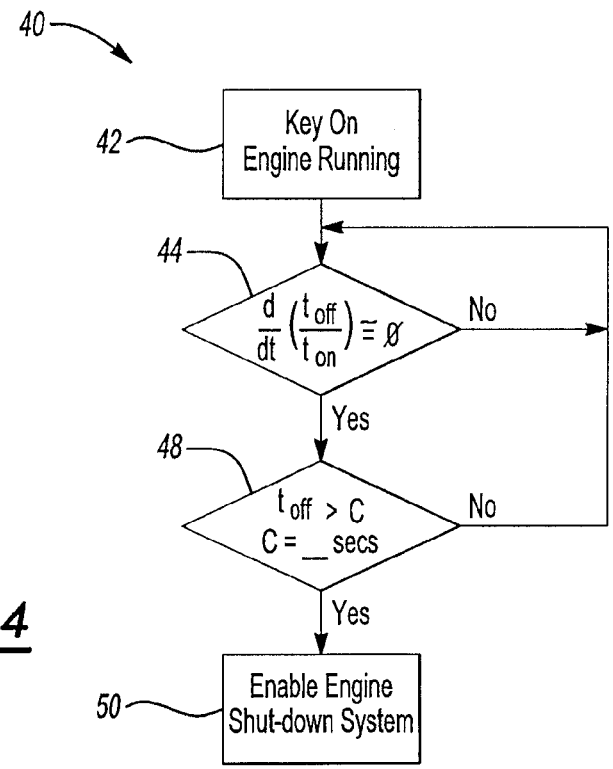
FIG. 4 is a flow chart showing an override system that overrides an engine shut-down system according to another alternative embodiment of the present disclosure.

Referring to FIG. 4, yet another embodiment of an override system 40 is disclosed. Once KOER 42 is determined, the rate of change is determined at 44 and the compressor off time is evaluated at 48. As shown in both FIGS. 3 and 4, it is preferred that the rate of change determination 44 is present in the override system 40. This determination 44 is important because it indicates that the air conditioner has pulled the vehicle cabin temperature down to a stabilized temperature. This is an important factor in deciding that the engine 12 will not need to restart quickly after shutting down in order to keep the cabin air at a desired temperature.

It should be understood that any or all of the rate of change determination 44, ratio determination 26, and clutch off time determination 48 may be used in the override system 40, and in any order. FIGS. 2-4 are mere examples of combinations of the three determinations 44, 46, and 48.

Figure 5:
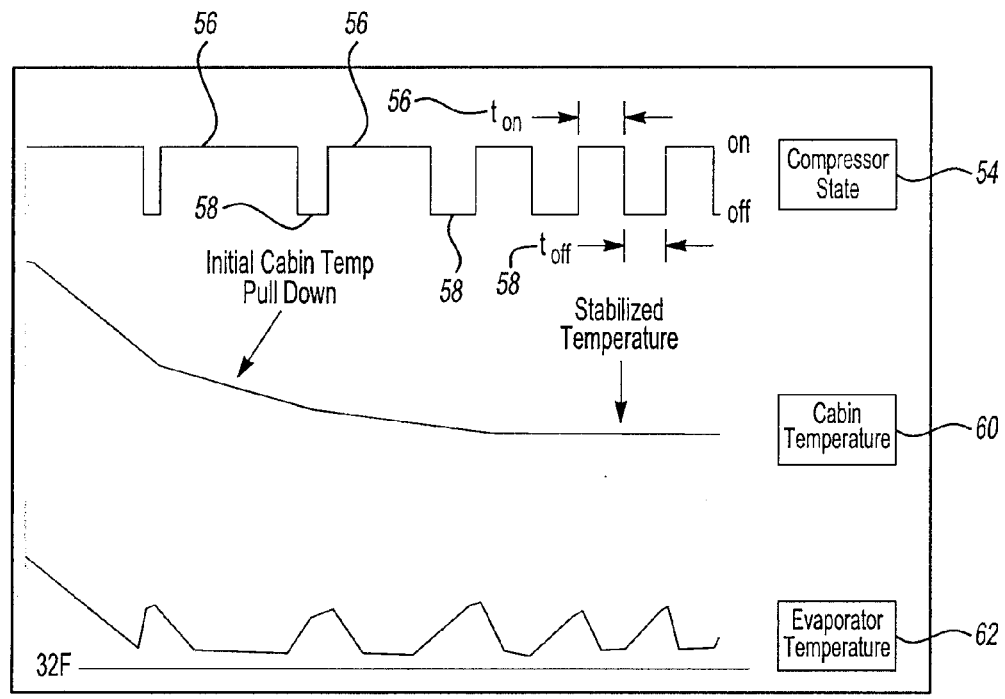
FIG. 5 is a graph showing an example of the compressor state, the cabin temperature, and the evaporator temperature as the cabin temperature is pulled down and stabilized.

Referring to FIGS. 1 and 5, the compressor state 54 is shown in an actuated phase and a non-actuated phase. A duty cycle includes $t_{on}$ when the clutch status sensor 28 indicates that the compressor 16 is actuated, and $t_{off}$ when the clutch status sensor 28 indicates that the compressor 16 is not actuated. Changes in $t_{on}$ and $t_{off}$ correspond to the change in cabin temperature 60. The compressor is actuated 56 much more than it is not actuated 58 in order to pull the cabin temperature down to a stabilized temperature that is desirable to the vehicle occupants. Once the temperature has stabilized, the compressor 16 does not need to be actuated as frequently as it did during the initial cabin temperature pull down.

The evaporator temperature 62 is also shown in FIG. 5. The clutch 18 is modulated on and off by the control module 26 to keep the evaporator from freezing. As the clutch 18 does not actuate the compressor 16 during $t_{off}$ a spike in the evaporator temperature 62 is shown, indicating a temperature rise preventing freezing. The amount of time $t_{on}$ and $t_{off}$ is then input into the override system 40 shown in FIGS. 2-4.

Figure 6:
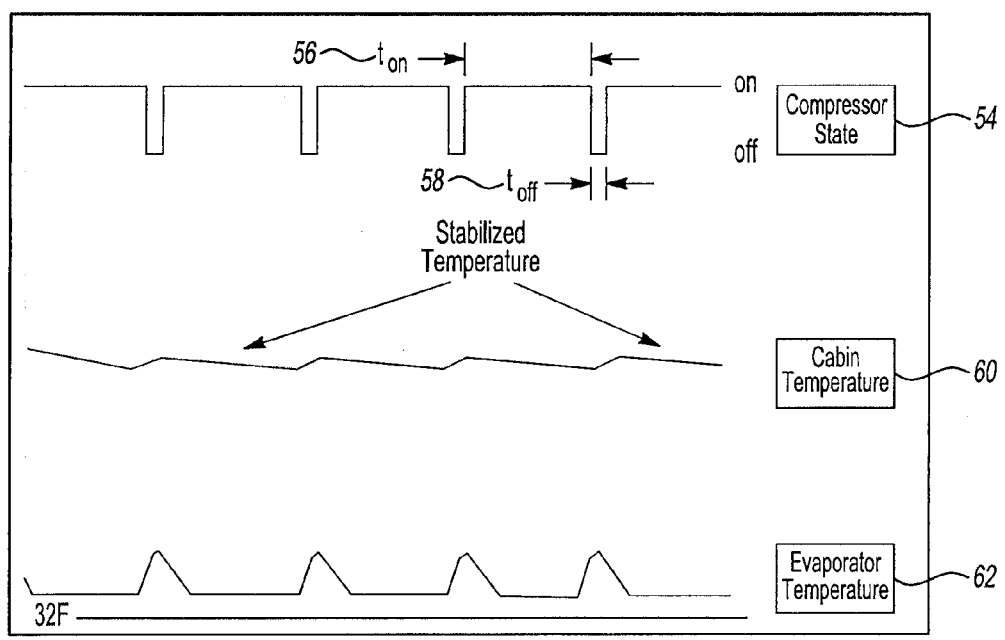
FIG. 6 is graph showing an example of the compressor state, the cabin temperature, and the evaporator temperature while the cabin temperature is stabilized.

Referring to FIG. 6, the compressor state 54 is shown during a time when the cabin temperature 60 is stable. The compressor state 54 remains mostly on, but is off at intervals to prevent the evaporator temperature 62 from remaining low and possibly causing the evaporator to freeze.

Referring to FIGS. 1-5, as the cabin temperature 60 is pulled down, the rate of change of the ratio of $t_{off}$ to $t_{on}$ is not approximately zero. Therefore, according to the override system 40, the engine shut-down system 14 would be disabled such that the engine continues to provide power to the compressor 16 through the clutch 18 and belt 20. However, once the temperature reaches a stabilized temperature exemplified in FIG. 6, the rate of change of the ratio of $t_{off}$ to $t_{on}$ is approximately zero. Therefore, the override system 40 does not disable the engine shut-down system upon the condition that the ratio is greater than a predetermined ratio at 46, and the time the compressor is off is greater than a predetermined time at 48.

Referring to FIGS. 1-6, it should be understood that a variable capacity air conditioner compressor may be used in the vehicle system 10. Sensors may be used to determine when the variable capacity compressor is operating at maximum and minimum capacity, as well as when the compressor is off. The control module may then compare the time the compressor is operating at maximum to the time the compressor is operating at minimum. This comparison may then be used in an override system as described in regards to FIGS. 2-4, and the engine shut-down system 14 may be disabled.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed:

1. An engine system for a vehicle comprising:
   an internal combustion engine having an engine shut-down system that automatically interrupts engine operation when vehicle operation indicates that no torque is required from the engine;
   an air conditioner compressor operative to cool a passenger compartment of the vehicle, wherein the air conditioner compressor is enabled in a first phase time and is disabled in a second phase time; and
   an override system that compares the time the air conditioner compressor is in the first phase time to the time the air conditioner compressor is in the second phase time to disable the engine shut-down system.

2. The engine system of claim 1, wherein the override system disables the engine shut-down system unless the override system determines that:
   the second phase time is greater than a predetermined time.

3. The engine system of claim 1, wherein the override system disables the engine shut-down system unless the override system determines that:
   a ratio of the second phase time to the first phase time has a rate of change of less than a predetermined threshold.

4. The engine system of claim 1, wherein the override system disables the engine shut-down system unless the override system determines that:
   the ratio of the second phase time to the first phase time is greater than a predetermined ratio.

5. The engine system of claim 1, wherein the override system disables the engine shut-down system unless the override system determines that:
   a ratio of the second phase time to the first phase time has a rate of change less than a predetermined threshold, and
   the second phase time is greater than a predetermined time.

6. The engine system of claim 1, wherein the override system disables the engine shut-down system unless the override system determines that:
   a ratio of the second phase time to the first phase time has a rate of change less than a predetermined threshold, and
   the ratio of the second phase time to the first phase time is greater than a predetermined ratio.

7. The engine system of claim 1, wherein the override system disables the engine shut-down system unless the override system determines that:
   the second phase time is greater than a predetermined time, and
   the ratio of the second phase time to the first phase time is greater than a predetermined ratio.

8. The engine system of claim 1, wherein the override system disables the engine shut-down system unless the override system determines that:

a ratio of the second phase time to the first phase time has a rate of change less than a predetermined threshold, the second phase time is greater than a predetermined time, and the ratio of the second phase time to the first phase time is greater than a predetermined ratio.

9. An engine system for a vehicle comprising:

an engine;

an air conditioner that cools a passenger compartment of the vehicle, the air conditioner includes a clutch that has a duty cycle that includes engaging and disengaging a compressor;

an engine shut-down system that automatically interrupts engine operation when the engine torque required is below a predetermined value; and an override system that monitors the duty cycle of the clutch to disable the engine shut-down system.

10. The engine system of claim 9, wherein the override system prevents the engine shut-down system from automatically interrupting engine operation unless the override system determines that:

the duty cycle has a rate of change less than a predetermined threshold, the compressor is disengaged for at least a predetermined time, and the duty cycle is less than a predetermined ratio.

11. The engine system of claim 9, wherein the override system prevents the engine shut-down system from automatically interrupting engine operation unless the override system determines that:

the duty cycle has a rate of change less than a predetermined threshold, and the compressor is disengaged for at least a predetermined time.

12. The engine system of claim 9, wherein the override system prevents the engine shut-down system from automatically interrupting engine operation unless the override system determines that:

the duty cycle has a rate of change less than a predetermined threshold, and the duty cycle is less than a predetermined ratio.

13. The engine system of claim 9, wherein the override system prevents the engine shut-down system from automatically interrupting engine operation unless the override system determines that:

the duty cycle has a rate of change less than a predetermined threshold.

14. The engine system of claim 9, wherein the override system prevents the engine shut-down system from automatically interrupting engine operation unless the override system determines that:

the compressor is disengaged for at least a predetermined time.

15. The engine system of claim 9, wherein the override system prevents the engine shut-down system from automatically interrupting engine operation unless the override system determines that:

the duty cycle is less than a predetermined ratio.

16. An air conditioning system for a vehicle having an engine and an engine shut-down system that automatically stops the engine, the air conditioning system comprising:

a compressor;

a clutch that engages the compressor in an activated phase and that disengages the compressor in a deactivated phase;

a clutch status signal generator that generates a clutch status signal that indicates that the clutch is either in the activated phase or in the deactivated phase; and a control module that monitors the clutch status signal and enables the engine stop system upon the determination that:

a ratio of the deactivated phase time to the activated phase time has a rate of change of approximately zero, the deactivated phase time is greater than a predetermined time, and the ratio of the deactivated phase time to the activated phase time is greater than a predetermined ratio.

* * * * *